United States Patent [19]

Wray

[11] Patent Number: 4,588,653

[45] Date of Patent: May 13, 1986

[54] MAGNETIC MEMORY DISK

[75] Inventor: Daniel X. Wray, Canoga Park, Calif.

[73] Assignee: Dynamic Disk, Inc., Carlsbad, Calif.

[21] Appl. No.: 619,475

[22] Filed: Jun. 11, 1984

Related U.S. Application Data

[63] Continuation-in-part of Ser. No. 527,349, Aug. 29, 1983, Pat. No. 4,469,566.

[51] Int. Cl.[4] .............................. G11B 5/66; G11B 5/82
[52] U.S. Cl. ...................................... 428/600; 428/610; 428/650; 428/658; 428/668; 428/680; 428/928; 360/135
[58] Field of Search ............... 428/600, 610, 611, 650, 428/652, 658, 928, 935, 668, 680; 360/135

[56] References Cited

U.S. PATENT DOCUMENTS

| | | | |
|---|---|---|---|
| 3,466,156 | 9/1969 | Peters et al. | 360/135 |
| 4,029,541 | 6/1977 | Barlow et al. | 360/135 |
| 4,144,160 | 3/1979 | Faulkner | 204/212 |
| 4,304,641 | 12/1981 | Grandia et al. | 204/DIG. 7 |
| 4,359,375 | 11/1982 | Smith | 204/212 |
| 4,469,566 | 9/1984 | Wray | 204/23 |

FOREIGN PATENT DOCUMENTS

| | | | |
|---|---|---|---|
| 615314 | 2/1961 | Canada | 360/135 |
| 26496 | 4/1981 | European Pat. Off. | 360/135 |
| 41321 | 12/1981 | European Pat. Off. | 360/135 |
| 12802 | 1/1977 | Japan | 360/135 |
| 73931 | 6/1980 | Japan | 360/135 |
| 156934 | 12/1981 | Japan | 360/135 |
| 156935 | 12/1981 | Japan | 360/135 |
| 74831 | 5/1982 | Japan | 360/135 |
| 85933 | 5/1983 | Japan | 360/135 |
| 164032 | 9/1983 | Japan | 360/135 |

Primary Examiner—L. Dewayne Rutledge
Assistant Examiner—John J. Zimmerman
Attorney, Agent, or Firm—Spensley Horn Jubas & Lubitz

[57] ABSTRACT

A magnetic memory disk which has controlled magnetic characteristics in the radial direction is provided by controlling the thickness and composition of the magnetic layer which is formed on the disk. The thickness of the layer may be varied in the radial direction to control the remanence of the disk and the composition of the magnetic layer varied to control the coercivity of the disk. The magnetic layer is formed by an electroplating operation employing one or more rotating apertured masks in an electrolyte solution between an anode and a disk (cathode) which is to be plated. The thickness of the plated layer is determined by the configuration of the apertures in the mask, and the relative composition of the layer is determined by the variation and distance of the mask to the disk in the radial direction. Thickness characteristics of layers other than the magnetic layer may also be precisely controlled in the radial direction to achieve desired characteristics.

8 Claims, 9 Drawing Figures

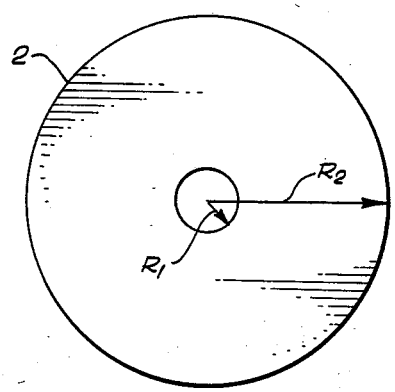
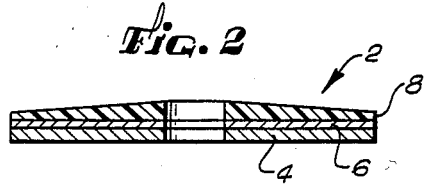
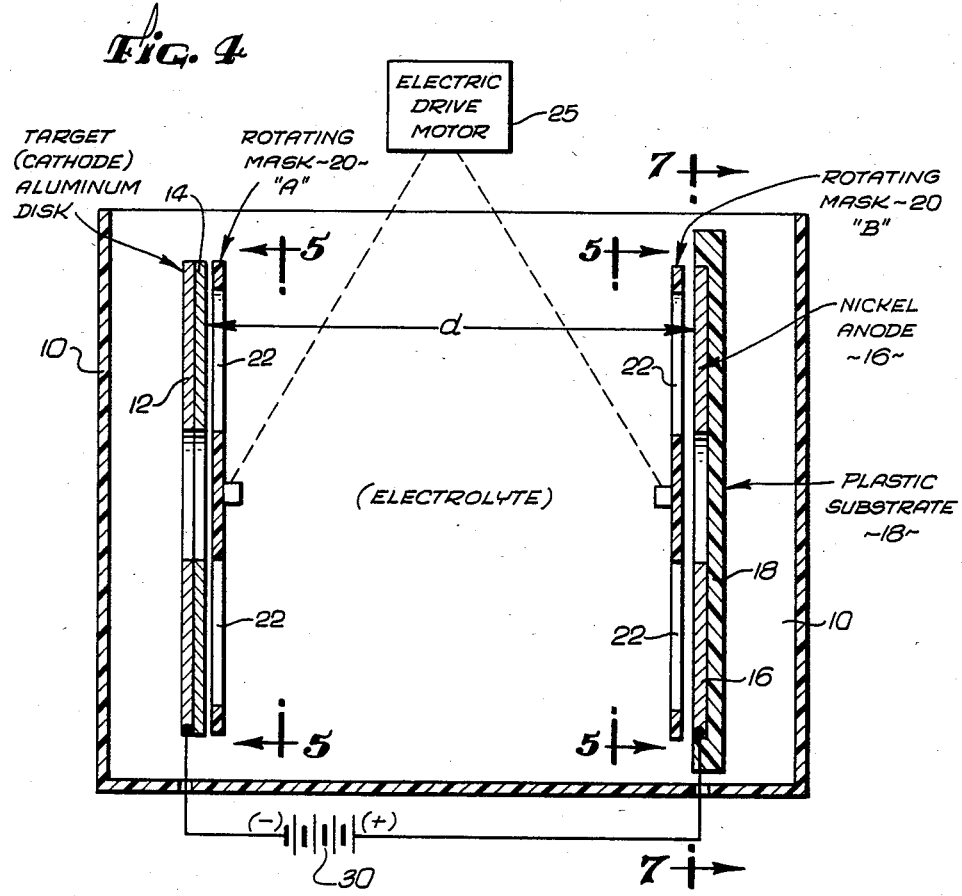

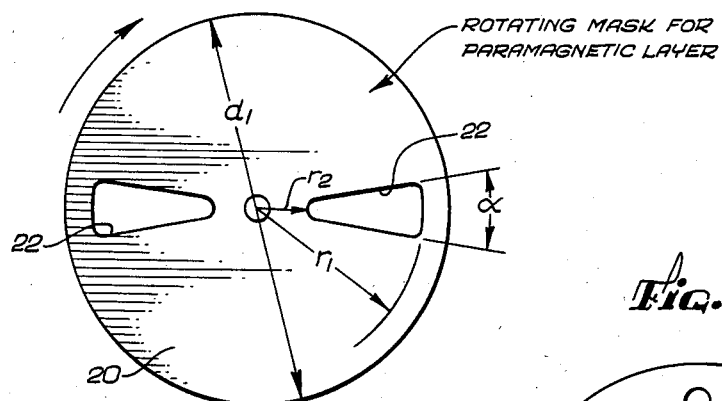
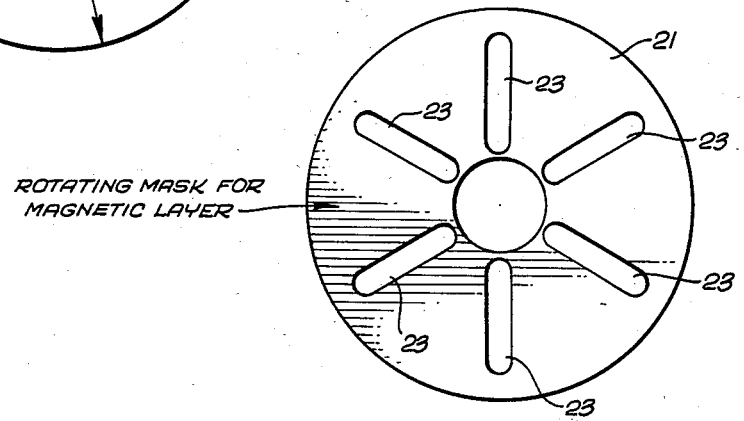
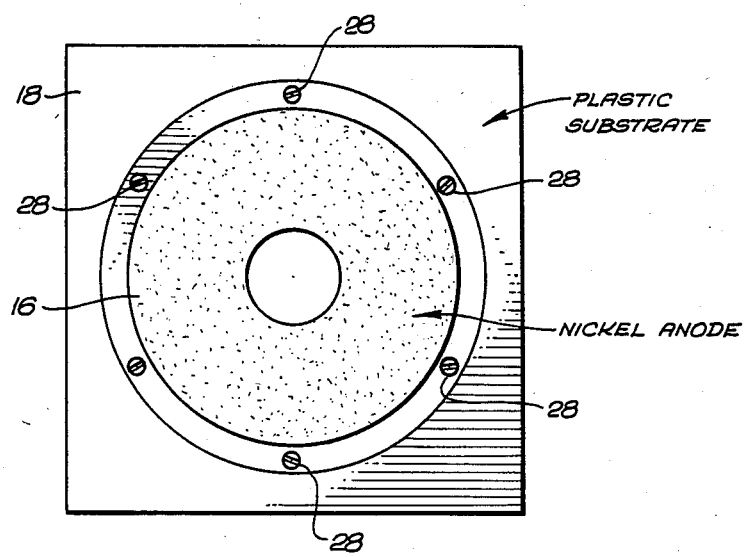

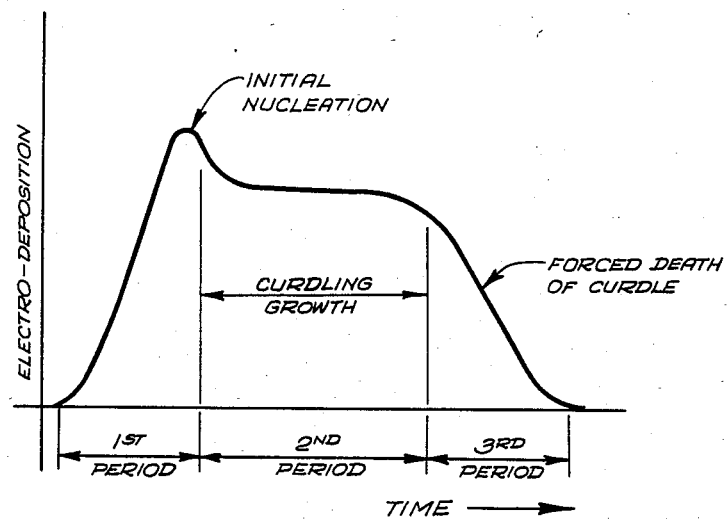
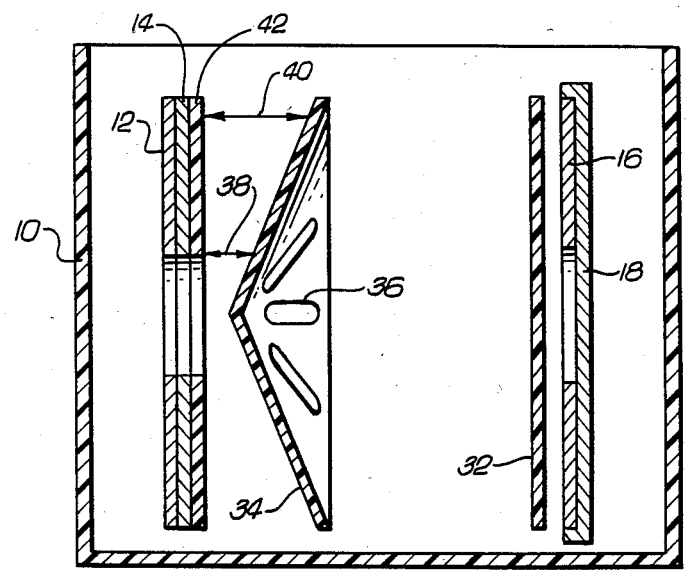

MAGNETIC MEMORY DISK

BACKGROUND OF THE INVENTION

1. Cross Reference to Copending Application

This application is a continuation-in-part of prior application Ser. No. 527,349, filed Aug. 29, 1983 now U.S. Pat. No. 4,469,566.

2. Field of the Invention

The present invention relates to magnetic memory disks and in particular to rigid magnetic memory disks of the type commonly referred to as "Winchester" disks.

In present-day data processing systems, it is the usual practice to employ magnetic memory disks for storing binary bits representing digital data. The memory disks usually comprise a magnetic disk which is scanned by a magnetic transducer, or head. The magnetic head is capable of inducing flux reversals in the magnetic domains of the disk and, in turn, of reading a pattern of magnetic orientations on the disk, and translating changes in the magnetic orientation into a series of digitally encoded binary bits.

Several types of magnetic head/magnetic disk interfaces are used in present-day data processing systems. For example, magnetic tape memories and floppy magnetic disk memories include magnetic heads which are in intimate contact with the magnetic memory. Another type of magnetic memory is known as the Winchester type which uses rigid magnetic disks. The Winchester magnetic disk memory provides maximum reliability and minimum error generation by eliminating physical contact between the magnetic head and the magnetic disk. This is achieved by means of a flying magnetic head which does not actually contact the surface of the magnetic disk. The head is configured so that air flow between the head and rotating disk cause the head to be lifted above the surface of the disk.

It is evident that for maximum efficiency it is essential that the actual displacement of the head from the surface of the magnetic disk be kept at a minimum. Present-day systems are available in which the displacement is of the order of 10–14 micro-inches. Accordingly, for satisfactory operation of the Winchester system it is essential that the surface of the magnetic disk be extremely flat and uniform.

3. Description of the Prior Art

In addition to flatness and surface uniformity, it has been a goal of disk designers to provide a disk having uniform magnetic characteristics over the entire surface of the disk. Several methods have been developed to provide such a disk. One method is disclosed in U.S. Pat. No. 4,304,641 to Grandia et al. In this patent, a thin metallic film is deposited by means of a rotary electroplating process in which a jet plate having nozzles of increasing size in the radial direction is employed so as to provide a differential flow distribution of the plating solution. The differential flow distribution provides a uniform current density, resulting in a uniform thickness and composition of the metallic film which is electroplated.

U.S. Pat. No. 3,463,708 to Grant discloses an electrolytic bath for magnetic deposition which is directed to achieving uniform magnetic properties across the surface of the disk. Both the Grant and Grandia patents recognize that varying current density or voltage will affect the thickness and composition of the electroplated film, and therefore the magnetic properties of the film.

U.S. Pat. No. 4,144,160 to Faulkner is directed to an apparatus for electrodepositing a magnetic film having a uniform thickness. Plating is accomplished with a magnetic electroplating head which traverses the disk radially at a controlled rate so that each area of the disk sees the same total plating current.

SUMMARY OF THE INVENTION

The present invention is directed to an improved rigid magnetic memory disk which does not have uniform magnetic characteristics across the surface of the disk. Rather, the magnetic characteristics of the disk are controlled in a predetermined fashion in the radial direction of the disk in order to achieve desired magnetic characteristics. These characteristics include both the remanence and coercivity of the magnetic layer of the disk.

A magnetic disk has a plurality of concentric data tracks. The disk is rotated at a constant angular velocity. The linear velocity of the disk with respect to a magnetic transducer will thus vary from the inside to the outside of the disk. Since the data rate is held constant, it follows that the bit length in the inner tracks of the disk will be shorter than the bit length of the outer tracks. As a result, the same write current may result in the writing of a different level signal on an inside track versus an outside track. The variation and bit length from the inside to outside tracks may result in substantial differences in the level of output signals when the disk is read. In addition, the relative difference in linear velocity of the head with respect to the disk from the inside to outside tracks results in a varying air flow between the head and the disk. As a consequence, the head will be positioned a different amount above the surface of the disk as a function of the radial position of the head. This also will affect the level of the signal read from the disk.

The present invention provides a method of optimizing the output signal across the radius of the disk by providing a disk which has varying magnetic characteristics in the radial direction. The magnetic characteristics may be carefully controlled in the radial direction so as to compensate for signal variations which would occur due to the inherent operation of the disk drive system. Both the thickness of the magnetic layer as well as the relative composition of constituents of the layer may be independently controlled in order to achieve desired remanence and coercivity characteristics.

BRIEF DESCRIPTION OF THE DRAWINGS

The invention will be described with reference to the accompanying drawings, wherein:

FIG. 1 is a plan view of a magnetic memory disk;

FIG. 2 is a sectional view of a disk in accordance with the present invention in which the magnetic layer has a controlled thickness in the radial direction;

FIG. 3 is a sectional view of a disk in accordance with the present invention in which the magnetic layer has a controlled composition in the radial direction;

FIG. 4 is a sectional schematic representation of an electrolytic apparatus used to produce disks of the present invention;

FIG. 5 is a front view of a rotating apertured mask for depositing a paramagnetic layer on a disk substrate, taken along lines 5—5 of FIG. 4;

FIG. 6 is a front view of a rotating apertured mask used for depositing a magnetic layer;

FIG. 7 is a front view of the anode of the apparatus of FIG. 4 taken along lines 7—7 of FIG. 4;

FIG. 8 is a curve useful in explaining the electroplating operation; and

FIG. 9 is a sectional view of an electrolytic apparatus showing a mask in accordance with an alternate embodiment of the invention.

DETAILED DESCRIPTION OF THE INVENTION

The following description is of the best presently contemplated mode of carrying out the invention. This description is made for the purpose of illustrating the general principles of the invention and is not to be taken in a limiting sense. The scope of the invention is best determined by reference to the appended claims.

Referring to FIG. 1, a Winchester-type magnetic memory disk 2 includes a magnetic surface extending from an inner radius R1 to an outer radius R2. When installed in a disk drive system, the disk 2 rotates at a constant angular velocity. A magnetic head moves radially across the surface of the disk to read data contained on the disk. Since the angular velocity of the disk is held constant, the linear velocity of the disk with respect to the head will vary depending on the radial position of the head. The linear velocity will be at a maximum when the head is at the outer track of the disk and at a minimum when the head is at the inner track of the disk.

Since the bit rate of data read from the disk is constant, it will be appreciated that the bit length will vary from the inside to the outside of the disk due to the variation in linear velocity of the disk with respect to the magnetic transducer. Bits on tracks to the outside of the disk will have a greater length than those on tracks to the inside of the disk. As a result of the different bit lengths, the magnetic energy which is stored for each bit may not be constant across the radius of the disk. In addition, the varying linear velocity causes the head to be spaced above the surface of the disk by different amounts at different points radially along the disk. This also will cause a variation in the strength of signals read from the disk.

FIG. 2 illustrates a cross section of one embodiment of a disk in accordance with the present invention. The disk is formed of an aluminum substrate 4 having an electroplated paramagnetic layer 6 over its surface and an electroplated magnetic layer 8 over the layer 6. The fine grain paramagnetic film is employed to provide a smooth surface for the magnetic layer 8. The paramagnetic film may be formed of various materials; in the present embodiment of the invention the film consists of 92–88% nickel and 8–12% phosphorus. Although not shown, a layer of zinc may be formed on the substrate prior to the plating of the paramagnetic layer to assist in the plating process.

As can be seen in FIG. 2, the thickness of the magnetic layer 8 varies from a maximum near the center of the disk to a minimum at the edge of the disk. This thickness is controlled so as to achieve the desired remanence characteristics for the disk in the radial direction of the disk. By providing a variable thickness and thus variable remanence in the radial direction, the overall remanence value per bit can be controlled to remain constant across the radius of the disk despite the change in the bit length over the surface of the disk. The thickness may also be controlled to take into account the varying height of the head over the disk so as to ensure that a substantially constant signal value will be obtained across the surface.

In addition to providing a disk with controlled remanence in the radial direction, the present invention is directed to a disk in which the coercivity of the magnetic layer is controlled in a predetermined fashion in the radial direction. Such a disk is illustrated in FIG. 3. Typically, the magnetic layer 8 is a metallic film formed of two or more metals. In the present embodiment of the invention, the film is an alloy of cobalt, nickel and phosphorus. As is known in the art, the coercivity of the film is affected by the relative composition of the constituents of the film. In the present invention, the coercivity in the radial direction is controlled by varying the relative concentrations of the nickel and cobalt in the magnetic film in the radial direction. This is illustrated by the varying density of dots in the film 8 in FIG. 3, with the dots representing the relative concentration of nickel versus cobalt. In samples which have been produced, the coercivity ranges between about 250 oersteds when the magnetic layer contains no cobalt to about 1000 oersteds when the magnetic layer contains no nickel.

Thus, the present invention provides a disk in which magnetic properties can be varied in the radial direction in a controlled fashion to provide desired operation. The thickness of the magnetic film may be varied to control the remanence of the disk and relative concentrations of metals in the film can be varied to control the coercivity of the disk. It should be noted that while the control of the remanence and coercivity was illustrated with respect to two separate disks, both properties may be controlled independently in a single disk. Thus, a disk may be produced in which the thickness (and therefore remanence) and the relative concentration of metals (and therefore coercivity) varies in the radial direction.

The method of producing disks in accordance with the present invention is generally as follows:

(1) an aluminum substrate is prepared by stamping a plate into the proper predefined dimensions.

(2) the substrates are then machined and stress relieved to obtain the finest tolerances possible.

(3) the substrates are then diamond turned and/or polished to an extremely fine finish.

(4) the polished substrates are then subjected to a series of plating operations to place a thin film of fine grain paramagnetic nickel/phosphorus material over the surface of the substrate. This film may be of uniform thickness in the radial direction or may be of varying thickness in a controlled fashion.

(5) the magnetic film is then electroplated over the paramagnetic film with the desired thickness and constituent concentration controlled in the radial direction.

(6) a protective barrier or coating may then be formed over the surfaces of the plated disk.

Referring to FIGS. 4–9, the manner in which the disks of the present invention are formed will be described. The apparatus of FIG. 4 includes a container 10 for an appropriate electrolyte for carrying out the electrodeposition process. The container may be composed of polypropylene or any other appropriate noncorrosive material.

A target electrode 12 is mounted in a container 10, and it may take the form, for example, of an aluminum disk which is intended to form a magnetic disk memory. The disk 12 may be formed as an aluminum substrate prepared by stamping a plate into proper predefined dimensions. The disk is then machined and stress relieved to obtain a smooth surface. The substrate disk is then diamond turned and polished to an extremely fine finish. A layer 14 of zinc oxide is formed on the disk to assist in the plating process.

An anode 16 (FIG. 7) is also mounted in the container 10 and is secured to an appropriate substrate 18 by means of screws 28. The anode is formed, for example, of nickel on the order of 99.99% purity. The substrate 18, like container 10, may be formed of polypropylene or other appropriate non-corrosive material.

One or more masks 20 are rotatably mounted in container 10 between the anode 16 and the target electrode 12. Two such masks, designated "A" and "B", are shown, one displaced approximately 200 mils from the target and the other displaced approximately 200 mils from the anode. This arrangement is employed for the electroplating operation of both the paramagnetic layer 6 and the magnetic layer 8 illustrated in FIGS. 2 and 3.

The mask used for the formation of the paramagnetic layer 6 is illustrated in FIG. 5. Each mask has a pair of apertures 22, each with a radial length corresponding to the radius of the area of the target 12 to be electroplated with the paramagnetic nickel/phosphorus layer, and each with radially extending sides. The masks "A" and "B" are rotated in unison by an electric drive motor 25 with their apertures aligned.

In a constructed embodiment, the target electrode 12 was placed in the container 10 and spaced in facing relationship with the anode 16, and spaced from the anode by a distance $d = \frac{1}{2}'' - 1\frac{1}{2}''$. The masks 20 may be formed, for example, of polyproplyene, Delrin, an epoxy glass, or other non-corrosive material.

As shown in FIG. 5, each mask 20 may have a disk shape and may, for example, have a diameter $d_1$ equal to 11 inches. Each aperture 22 may have the shape shown in FIG. 2, and have the following placement and dimensions: $r_1 = 2.550''$, $r_2 = 0.750''$, $\alpha = 22°$.

As shown in FIG. 4, a source 30 of direct current voltage is connected across the anode 16 and the target electrode 12. The nickel/phosphorus layer may be electrodeposited on the target electrode 12, for example, from any appropriate known electrolyte, such as a sulphate electrolyte. The following table sets forth the composition of a nickel/sulfate chloride electrolyte by which the nickel/phosphorus layer may be deposited on the surface of the target electrode:

| | |
|---|---|
| NiSO$_4$6H$_2$O | 70 g./l. |
| NaBO$_3$ | 40 g./l. |
| NaH$_2$PO$_2$H$_2$O | 3 g./l. |
| Saccharin | 8 g./l. |
| Sodium Formate (Na COOH) | 10 g./l. |

Plating may be carried out at current densities of 25–200 milliamps per square inch. The resistivity can be established to a desired value by adding propylene glycol to the electrolyte.

The curve of FIG. 8 illustrates the manner in which the paramagnetic film is deposited on the target electrode by the apparatus. This is achieved by the rotating mask in the apparatus which provides nucleation energy for electro-deposition on flawed lattice areas, as shown by the curve of FIG. 8 (first period), and by then providing for a non-zero curdling growth for a predetermined period (second period), followed by a forced curdling death (third period), leaving enough randomly oriented nucleation sites for the next growth. The process by which the electrodeposited layers are formed is described in more detail in U.S. Pat. No. 4,469,566 the disclosure of which is incorporated herein by reference.

The use of the mask shown in FIG. 20 facilitates the formation of a paramagnetic layer having a uniform thickness in the radial direction. The sides of the apertures 22 are defined by radial lines. The apertures control the time exposure of the plating current from the anode 16 to the target disk 12. The sector-shaped opening 22 defined by the radial sides ensures that each point along the radius of the target disk will be exposed to the plating current for the same increment of time. That is, although the width of the opening 22 is greater near the outside of the mask 20, the linear velocity of the mask with respect to the target disk is also greater at the outside. The exposure time for each increment of area on the target disk will therefore be constant from the inside to the outside of the disk. By maintaining the current exposure time constant, a layer having extremely uniform thickness may be deposited.

In order to form the magnetic layer 8 which has a varying thickness in the radial direction, masks 21 as shown in FIG. 6 are employed. Each mask 21 includes openings 23 which have a substantially uniform width, in contrast to the sector-shaped openings of the mask 20. The uniform width causes the exposure time of the plating current to vary from the inside to the outside of the target disk. The greater linear velocity of the mask 21 with respect to the outside of the target disk means that the outside of the target disk receives plating current for a smaller increment of time than the inside of the disk, thus resulting in a decreasing thickness of the layer 8 from the inside to the outside of the disk.

Many different electrolytes may be used for the formation of the magnetic layer 8. In the present embodiment of the invention, a nickel/cobalt/phosphorus layer is deposited from an electrolyte of the following composition:

| | |
|---|---|
| CoSO$_4$6H$_2$O | 40 g./l. |
| NiSO$_4$6H$_2$O | 10 g./l. |
| H$_2$BO$_3$ | 40 g./l. |
| NaH$_2$PO$_3$ | 6 g./l. |
| COOH | 10 g./l. |

Thus, it can be seen that the thickness of the deposited layer may be controlled in the radial direction by controlling the relative plating current exposure time, which is determined by the configuration of the openings in the mask. It will thus be appreciated that layers having thickness characteristics in the radial direction different from those shown in the disk of FIG. 2 may be simply formed by varying the configuration of openings in the masks used to control the electrodeposition process.

As discussed above, the thickness variation of the magnetic layer of the disk determines its remanence characteristics in the radial direction. The coercivity characteristics of the disk may also be controlled in the radial direction by employing a planar mask 32 having the same configuration as the mask 21 of FIG. 6 and a mask 34 which has a similar aperture configuration as the mask 32 but which has a substantially conical cross section, as illustrated in FIG. 9. The mask 32 serves to collimate the current from the anode 16. As the current passes through the electrolyte toward the aluminum disk 12 (now including a paramagnetic layer 42) it tends to spread out within the electrolyte. Since the apertures in the masks 32 are all spaced equally from the anode 16, the current density will remain constant from the top to bottom of the container 10. However, when the current reaches the mask 34, it will pass through the apertures 36 and will again begin to spread out. By controlling the distance of the apertures from the disk 12 in the radial direction, the spreading of the current will begin at different points and a varying current density may be achieved in the radial direction. Thus, the distance of the mask from the disk 12 and layer 14 may vary from a minimum indicated at 38 to a maximum indicated at 40. As a result, the current density toward the inside of the disk 12 will be greater than that toward the outside, since the current will have spread out to a lesser extent by the time it reaches the disk. By controlling the current density in the radial direction in this fashion, the relative composition of the material which is plated onto the disk can also be controlled. It is well known that the current density affects the composition of the material which is plated onto the disk. The composition in turn determines the coercivity characteristics. Therefore, the use of a mask which has apertures whose distance from the disk to be plated varies from inside to outside of the disk facilitates the control of coercivity characteristics of the disk in the radial direction. It should be noted that although the mask 34 shown in FIG. 9 varies linearly in its distance from the disk 12 in the radial direction, other mask configurations could be employed in order to achieve the desired coercivity characteristics in the radial direction.

It will be appreciated that while particular embodiments of the invention has been shown and described, various modifications may be made without departing from the scope of the invention.

What is claimed is:

1. A magnetic memory disk, comprising:
   a disk-shaped substrate;
   an electroplated base layer over a surface of the disk; and
   an electroplated magnetic layer formed on the base layer, said magnetic layer comprising an alloy of at least two metals varying in relative concentrations in the alloy in a controlled fashion radially along the disk and providing a controlled varying value of coercivity in the radial direction of the disk.

2. A magnetic memory disk according to claim 1 wherein the alloy includes cobalt and nickel.

3. A disk according to claim 1 wherein the magnetic layer has a predetermined thickness which varies in a controlled fashion in the radial direction to provide predetermined remanence characteristics which vary along the radius of the disk.

4. A disk according to claim 1, wherein the substrate is aluminum and including a zinc layer formed on the surface of the substrate, wherein said base layer is formed on the surface of the zinc layer.

5. A magnetic memory disk, comprising:
   a disk-shaped substrate;
   an electroplated base layer formed over a surface of the substrate; and
   an electroplated magnetic layer formed on the base layer, said magnetic layer having a controlled varying thickness in the radial direction to provide predetermined magnetic response characteristics, said magnetic layer being comprised of an alloy of at least two metals, wherein the relative concentration of the metals varies in a controlled fashion in the radial direction to provide predetermined coercivity characteristics.

6. A memory disk according to claim 5 wherein the magnetic layer includes cobalt and nickel.

7. A memory disk according to claim 5 wherein the magnetic layer includes cobalt, nickel and phosphorus.

8. A disk according to claim 5, wherein the substrate is aluminum and including a zinc layer formed on the surface of the substrate, wherein said base layer is formed on the surface of the zinc layer.

* * * * *